US006683670B2

United States Patent
Chung et al.

(10) Patent No.: US 6,683,670 B2
(45) Date of Patent: Jan. 27, 2004

(54) LIQUID CRYSTAL DISPLAY DEVICE UTILIZING SPACERS IN BOTH THE SEAL AND ACTIVE REGIONS AND METHOD OF MANUFACTURING THE SAME

(75) Inventors: In Jae Chung, Kyongsangbuk-do (KR); Kyeong Jin Kim, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 58 days.

(21) Appl. No.: 09/988,678

(22) Filed: Nov. 20, 2001

(65) Prior Publication Data

US 2002/0060770 A1 May 23, 2002

(30) Foreign Application Priority Data

Nov. 21, 2000 (KR) .................. P2000-0069277

(51) Int. Cl.[7] ............................................. G02F 1/1339
(52) U.S. Cl. ................... 349/153; 349/155; 349/190
(58) Field of Search ................. 349/153, 154, 349/155, 189, 190

(56) References Cited

U.S. PATENT DOCUMENTS

| 4,283,119 A | * | 8/1981 | Hofmann ............... 349/153 |
| 4,640,583 A | * | 2/1987 | Hoshikawa et al. ........ 349/153 |
| 4,691,995 A |   | 9/1987 | Yamazaki et al. |
| 5,335,103 A | * | 8/1994 | Kim ..................... 349/154 |
| 5,379,139 A | * | 1/1995 | Sato et al. .............. 349/155 |
| 5,481,388 A | * | 1/1996 | Aoya .................... 349/153 |
| 5,556,670 A | * | 9/1996 | Mihara et al. ............ 428/1.5 |
| 5,739,888 A | * | 4/1998 | Ogura et al. ............. 349/153 |
| 5,995,191 A | * | 11/1999 | Tamai et al. ............ 349/156 |
| 6,115,098 A | * | 9/2000 | Kume et al. ............. 349/156 |
| 6,141,078 A | * | 10/2000 | Morii et al. ............. 349/155 |
| 6,292,249 B1 | * | 9/2001 | Kane et al. .............. 349/155 |

FOREIGN PATENT DOCUMENTS

| JP | 5-66410 | 3/1993 |
| JP | 6-235925 | 8/1994 |
| JP | 8-101395 | 4/1996 |
| JP | 9-61829 | 3/1997 |
| JP | 10-177178 | 6/1998 |
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |

* cited by examiner

Primary Examiner—Carl Whitehead, Jr.
Assistant Examiner—Stephen W. Smoot
(74) Attorney, Agent, or Firm—Morgan, Lewis & Bockius LLP

(57) ABSTRACT

A liquid crystal display device includes a first substrate, a second substrate having a seal region and an active region, a seal pattern on the seal region between the first and second substrates, a plurality of spacers in the active region and in the seal region, and a liquid crystal layer between the first and second substrates.

19 Claims, 4 Drawing Sheets

LIQUID CRYSTAL DISPLAY DEVICE UTILIZING SPACERS IN BOTH THE SEAL AND ACTIVE REGIONS AND METHOD OF MANUFACTURING THE SAME

The present invention claims the benefit of Korean Patent Application No. P2000-0069277 filed on Nov. 21, 2000, which is hereby incorporated by reference.

BACKGROUND OF THE INVENTION

1. Field of the Invention

The present invention relates to a liquid crystal display (LCD) device and a method of manufacturing the same, and more particularly, to a seal for a liquid crystal display device and a method of manufacturing a seal for a liquid crystal display device.

2. Background of the Related Art

FIGS. 1A–1C show a structure of a related art seal pattern 1 between first and second substrates 20 and 30 of a liquid crystal display device.

In FIG. 1A, a liquid crystal injection method is shown. During the liquid crystal injection method, the seal pattern 1 having an injection hole is printed on one or both of the first and second substrates 20 and 30, and an end-seal pattern is formed thereon. In FIG. 1B, a liquid crystal dispensing method is shown. During the liquid crystal dispensing method, the seal pattern 1 having no injection hole is printed on one or both the first and second substrates 20 and 30, and then the liquid crystal is uniformly dispensed on an active region at an inner side of the seal pattern 1.

A method for forming the seal pattern 1 will be described as follows.

In a first process step, an epoxy resin 2 is mixed with a glass fiber 3 to maintain a cell gap ratio of 100:1 in a beaker for ten minutes. The epoxy resin 2 includes a thermo-hardening epoxy resin, a photo hardening epoxy resin, or a thermo- and photo-hardening epoxy resin, for example. The epoxy resin has a viscosity between 30,000 cp and 600,000 cp.

In a second process step, a seal compound of the epoxy resin 2 and the glass fiber 3 is stirred to remove bubbles for two hours under a vacuum of 760 mmHg.

In a third process step, the seal compound void of any bubbles is hermetically maintained in a cylinder at a temperature below 0° C.

In a fourth process step, the seal compound and cylinder are maintained at an ambient temperature for three hours or more. Then, a dispensing or printing process step is performed, thereby forming the seal pattern 1 within a seal region "S" on the substrate.

In FIG. 1C, the glass fiber 3 is mixed with the epoxy resin 2 between the first and second substrates 20 and 30 by the seal pattern. Spacers 4 are disposed around a peripheral region within an active region "A." A liquid crystal layer 5 is also disposed within the active region "A."

However, the related art method for forming the seal pattern has the following problems. When the glass fiber 3 is mixed with the epoxy resin 2, gas bubbles are generated. The gas bubbles are removed under vacuum during the second process step. However, when a high viscosity epoxy resin is used to make the seal compound, the gas bubbles are not completely removed during the second process step. Accordingly, the seal pattern 1 may be compromised due to the gas bubbles being present in the seal pattern 1, or due to out-gassing of the gas bubbles inside the seal pattern 1. Therefore, external moisture may penetrate into the liquid crystal display device through the seal pattern 1, thereby degrading picture quality.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device using a seal material that does not generate gas bubbles.

Another object of the present invention is to provide a liquid crystal display device having spacers formed in an active region provided with liquid crystal material.

Another object of the present invention is to provide a method of manufacturing a liquid crystal display device having spacers formed in an active region provided with liquid crystal material.

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display device includes a first substrate, a second substrate having a seal region and an active region, a seal pattern on the seal region between the first and second substrates, a plurality of spacers in the active region and in the seal region, and a liquid crystal layer between the first and second substrates.

In another aspect, a liquid crystal display device includes a first substrate, a second substrate opposite to the first substrate, a seal region along a periphery of the second substrate, an active region within the seal region, at least one seal pattern disposed within the seal region between the first and second substrates, a plurality of spacers within the active region and within the seal region, and a liquid crystal layer between the first and second substrates.

In another aspect, a method of manufacturing a liquid crystal display panel includes forming a seal region along a periphery of one of first and second substrates, forming an active region within the seal region, forming at least one seal pattern within the seal region between the first and second substrates, forming a plurality of spacers within the active region and within the seal region, and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
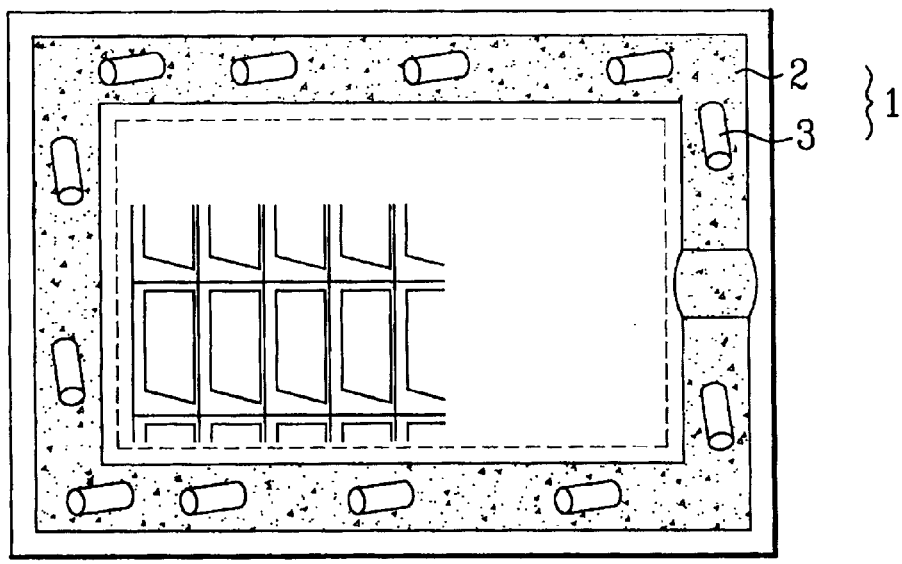
FIGS. 1A and 1B show a seal pattern between first and second substrates according to a related art liquid crystal display device.
Figure 1B:
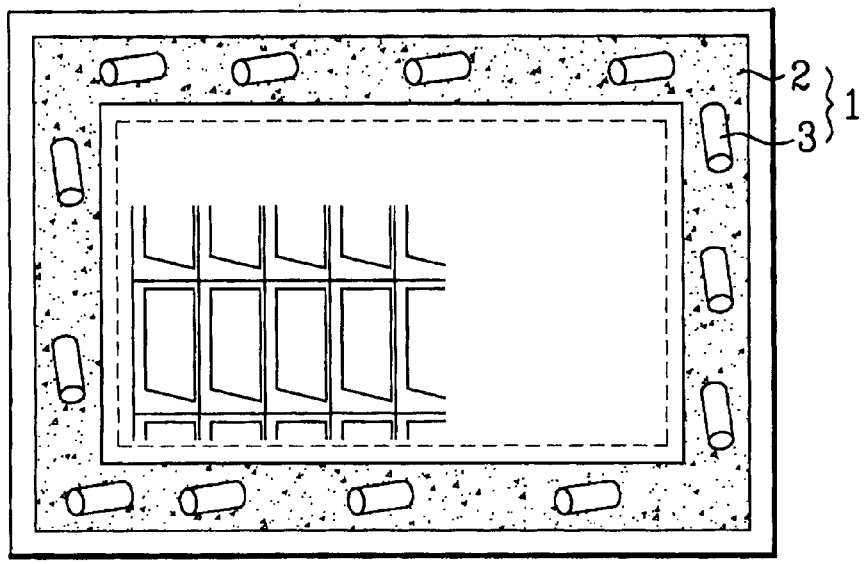
Figure 1C:
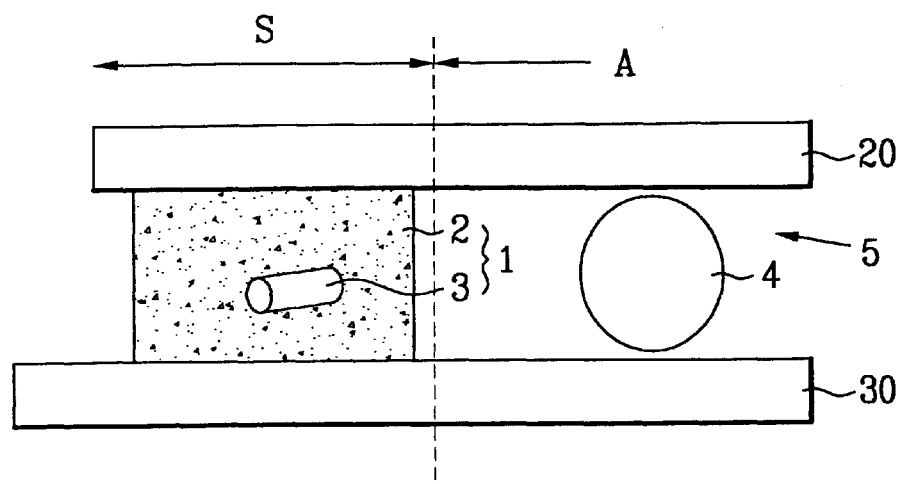
FIG. 1C is a sectional view of FIG. 1A.
Figure 2A:
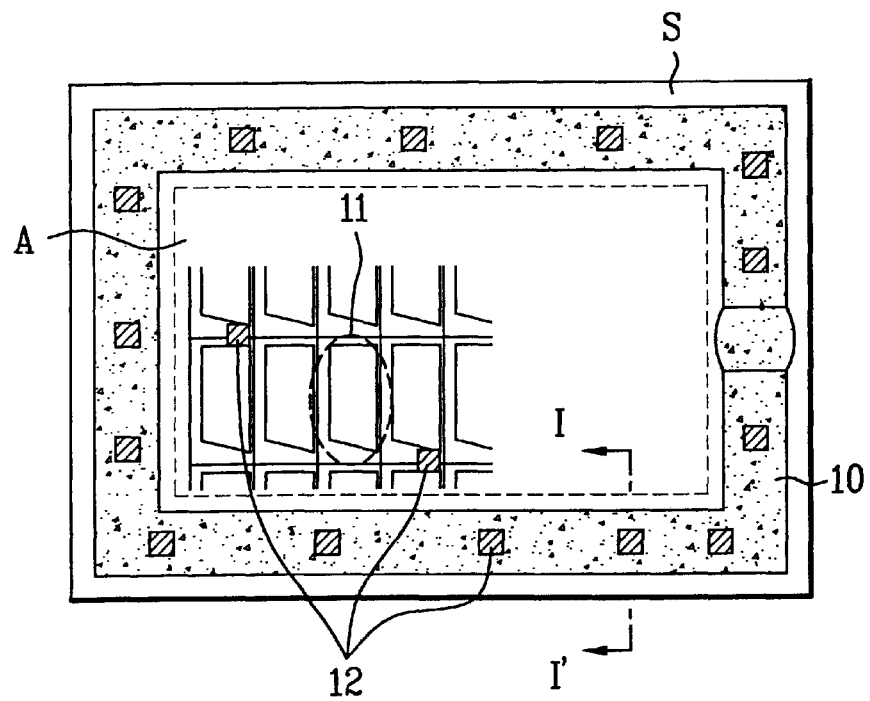
FIG. 2A shows an exemplary seal pattern of a liquid crystal injection method according to the present invention.
Figure 2B:
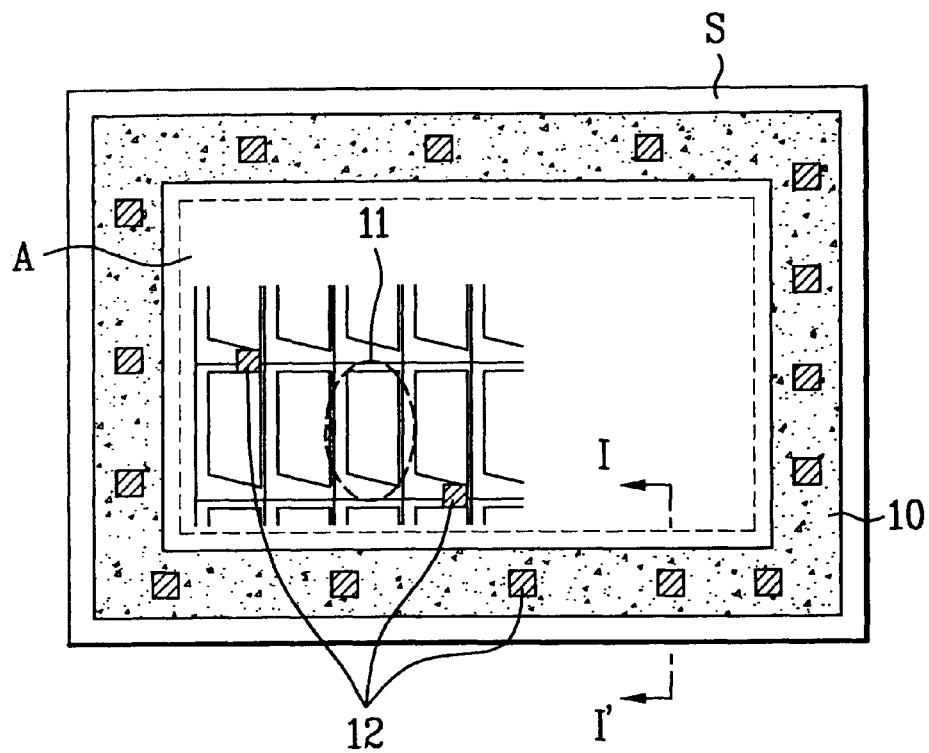
FIG. 2B shows another exemplary seal pattern of a liquid crystal dispensing method according to the present invention.
Figure 3A:
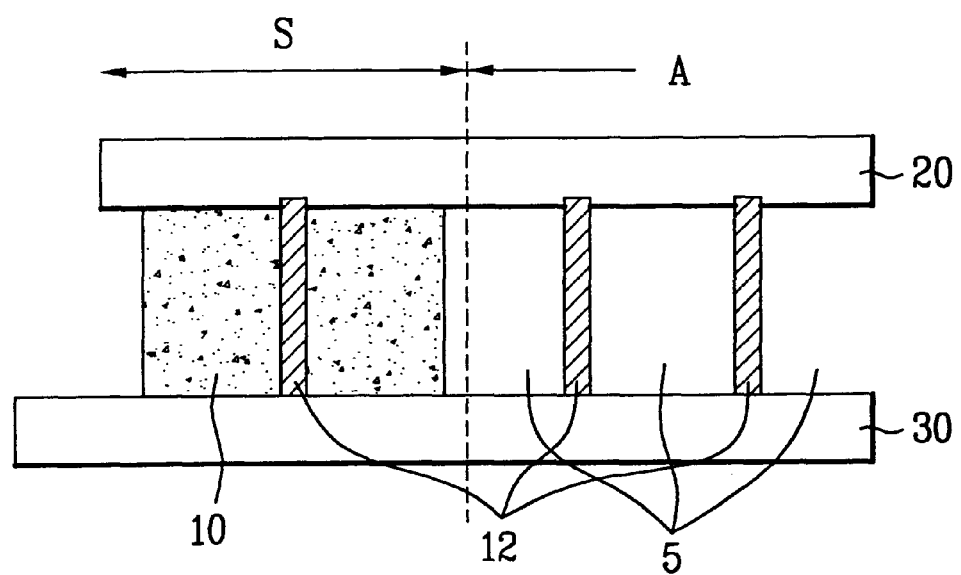
FIG. 3A is a sectional view taken along I–I' of FIGS. 2A and 2B according to the present invention.

FIGS. 2A and 2B show exemplary seal patterns of a liquid crystal display device according to the present invention. FIG. 3A is a cross sectional view taken along I–I' of FIGS. 2A and 2B.

A second substrate 30 (as shown in FIG. 3A) may be formed as various structures. In a color filter on transistor (COT) structure, a color filter, a TFT, and conductive signal lines are sequentially formed on a transparent substrate, thereby forming the second substrate. In a transistor on color filter (TOC) structure, a TFT, conductive signal lines, and a color filter are sequentially formed on a transparent substrate. Alternatively, the color filter may be formed on the first substrate 20, and the TFT may be formed on the second substrate 30.

In FIGS. 2A and 2B, first and second substrates 20 and 30 may include a seal region "S" and an active region "A." The seal pattern 10 may be formed at least within the seal region "S," and the active region "A" may include thin film transistor (TFTs) (not shown) formed in unit pixels 11. The seal region "S" may be circumferentially disposed about the active region "A." Within the active region "A," a plurality of pixel regions 11 are defined by orthogonal gate lines and data lines, and a TFT may be formed in a portion where the gate line crosses the data line, wherein one TFT is arranged in each unit pixel 11.

The TFT (not shown) may include a gate electrode, a gate insulating film, a semiconductor film, an ohmic contact film, and source/drain electrodes. The gate electrode connects with the gate line and is formed on the transparent substrate simultaneously with the gate line. The gate insulating film may be deposited on an entire surface of the substrate including the gate electrode. The semiconductor film and the ohmic contact film may be sequentially formed on the gate insulating film. The source and drain electrodes may be formed on the ohmic contact film simultaneously with the data line, and the source electrode may be connected with the data line.

Then, a passivation film may be formed on the entire surface of the substrate including the TFT. A portion of the passivation film disposed on the drain electrode may be removed and a corresponding portion of the drain electrode may be exposed. A transparent conductive film may be connected with the drain electrode through the exposed portion, thereby forming a pixel electrode in the pixel region.

A method for forming the seal pattern 10 may be classified as a liquid crystal injection method and a dispensing method. FIG. 2A shows an exemplary liquid crystal injection method according to the present invention. FIG. 2B shows an exemplary liquid crystal dispensing method according to the present invention.

In FIG. 2A, a first seal pattern including the injection hole may be printed on the substrate, and liquid crystal molecules may be injected through the injection hole. Then, a second seal pattern for the end seal pattern may be formed thereon.

In FIG. 2B, a seal pattern having no injection hole may be printed on the substrate, and then a liquid crystal material may be uniformly dispersed on an active region at an inner side of the seal pattern. The seal pattern 10 may be formed by a dispenser or printing method, for example.

In both the exemplary injection and dispensing methods, spacers 12 may be formed on the first substrate 20 as shown in FIG. 3A, and the seal pattern 10 may be formed on the second substrate 30, thereby maintaining a cell gap of the seal pattern 10. The seal pattern 10 may be formed using a seal material that does not generate gas bubbles. The spacers 12 may be formed on a circumferential region of the first substrate 20 as well as within an active region "A" except for corresponding pixel regions of the second substrate 30. A cleaning process, a process for forming an alignment film, and a rubbing process may be performed. Then, the seal pattern 10 is printed on the second substrate 30, and the first and second substrates 20 and 30 are attached to each other, thereby forming a panel.

Each of the spacers 12 is a column spacer of an organic resin material such as photo-acryl resin, for example, that may be formed on the first substrate 20 by exposing and developing processes, for example. The seal pattern 10 may be formed of a thermo-hardening resin, a photo ultraviolet hardening resin, and a thermo- and photo-hardening resin, for example.

The spacers 12 may be formed among at least twelve unit pixels 11 (see FIGS. 2A and 2B) to uniformly maintain the cell gap. The column spacer 12 may be formed having a width between about 10 μm and about 20 μm, and a height between about 2 μm and about 5 μm. Although the spacers 12 and the seal pattern 10 may be formed on either the first or second substrates the seal pattern 10 may be formed after forming the spacers 12.

Since the liquid crystal display device is an electro-optical device wherein a voltage is applied to liquid crystal molecules injected between the substrates, it is necessary to maintain a constant distance between the substrates to assure application of a uniform electric field. Accordingly, if the cell gap is not constant, transmittance of light is not spatially uniform, thereby generating a uniformity defect. Furthermore, the spacers 12 may be arranged among several pixel regions on the active region "A". With large-sized display panels, it may not be sufficient to form the spacers only in the seal pattern.

FIG. 3A is a cross sectional view taken along I–I' of FIGS. 2A or 2B showing exemplary spacer pattern according to the present invention. In FIG. 3A, spacers 12 may be arranged within the seal pattern 10 and within a liquid crystal layer 5 of the active region "A" to maintain the cell gap between the first and second substrates 20 and 30. The seal pattern 10 may be formed by using a seal material that does not generate gas bubbles, thereby preventing a seal defect, moisture penetration, and out-gassing.

Figure 3B:
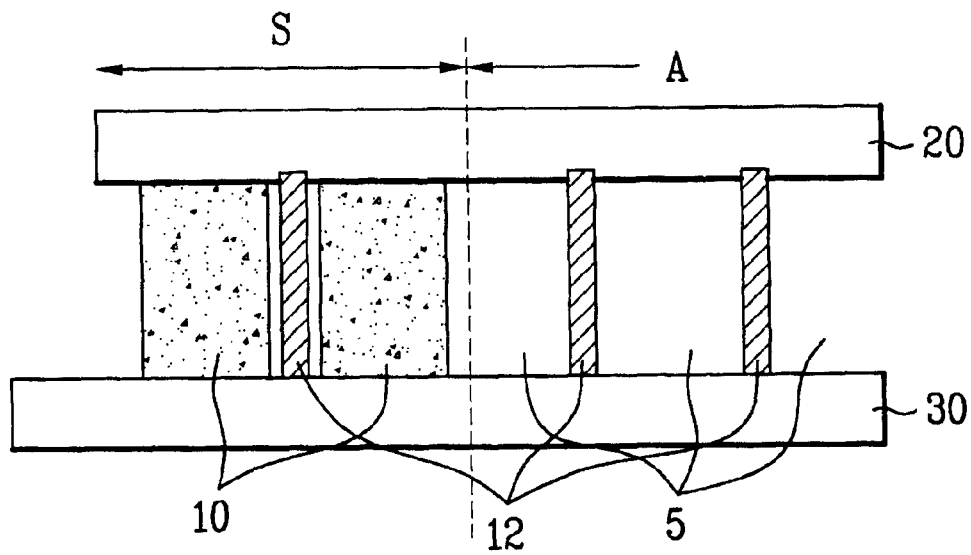
FIG. 3B is a sectional view of another exemplary seal pattern according to the present invention.

FIG. 3B is a cross sectional view of another exemplary seal pattern according to the present invention. In FIG. 3B, spacers 12 may be formed within a seal region "S" between seal patterns 10, thereby forming a double seal pattern. The double seal pattern is effective for preventing external moisture from penetrating into the active region "A." Furthermore, while dispensing the seal pattern 10, a disconnection of the double seal pattern is prevented. The seal pattern 10 may be formed of a material that does not generate a significant amount of gas bubbles. Although gas bubbles may be generated, the spacers 12 formed within the double seal pattern prevent any moisture from penetrating into the active region "A."

Figure 3C:
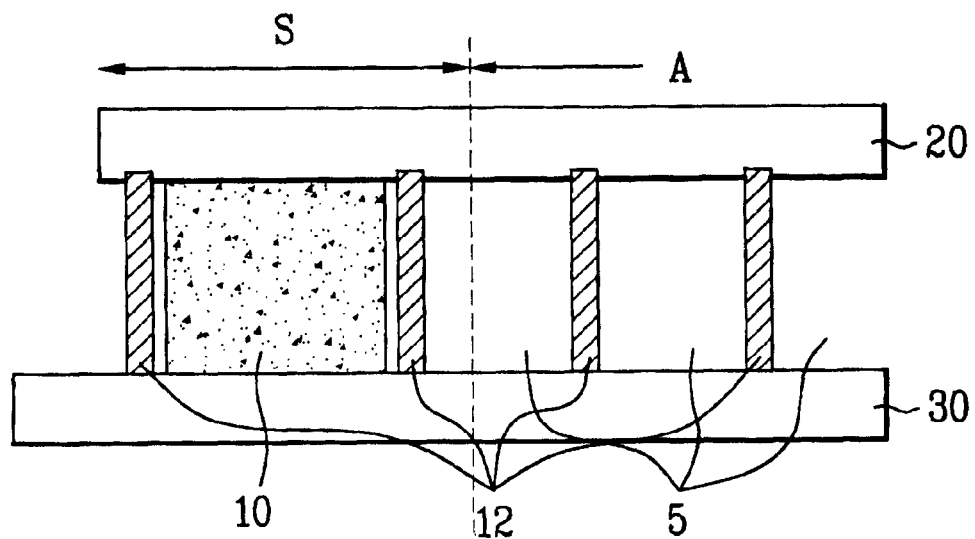
FIG. 3C is a sectional view of another exemplary seal pattern according to the present invention.

FIG. 3C is another exemplary spacer pattern according to the present invention. In FIG. 3C, spacers 12 may be formed within a seal region "S" at lateral opposing sides of a seal pattern 10 to maintain a constant cell gap between first and second substrates 20 and 30.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   a second substrate opposite to the first substrate;
   a seal region along a periphery of the second substrate;
   an active region within the seal region;
   at least one seal pattern within the seal region between the first and second substrates, the at least one seal pattern having two patterns disposed parallel to each other;
   a plurality of column spacers within the active region and within the seal region, the plurality of column spacers within the seal region being arranged between the two seal patterns; and
   a liquid crystal layer between the first and second substrates.

2. The device according to claim 1, wherein the at least one seal pattern includes one of a thermo-hardening resin, a photo-hardening resin, and a thermo- and photo-hardening resin.

3. The device according to claim 1, wherein the plurality of column spacers are formed of an organic resin.

4. The device according to claim 3, wherein the organic resin is a photo-acryl resin.

5. The device according to claim 1, wherein a width of the column spacers is between about 10 $\mu$m and about 20 $\mu$m.

6. The device according to claim 1, wherein a height of the column spacers is between about 2 $\mu$m and about 5 $\mu$m.

7. The device according to claim 1, wherein the active region includes a plurality of pixel units.

8. The device according to claim 1, wherein each of the plurality of column spacers in the active region is disposed within the liquid crystal layer.

9. The device according to claim 1, wherein the plurality of column spacers are formed on the active region except for pixel regions.

10. The device according to claim 1, wherein the liquid crystal layer is formed by one of a liquid crystal injection method and a dispensing method.

11. The device according to claim 1, wherein the seal pattern is formed by one of a dispensing process and a printing process.

12. The device according to claim 1, wherein the plurality of column spacers are formed on the active region and an outer region of the seal pattern.

13. The device according to claim 1, wherein the plurality of column spacers abut the at least one seal pattern.

14. The device according to claim 1, wherein the plurality of column spacers are disposed at a distance from the two seal patterns.

15. The device according to claim 1, wherein the plurality of column spacers within the seal region laterally oppose the at least one seal pattern.

16. A method of manufacturing a liquid crystal display panel, comprising:
   forming a seal region along a periphery of one of first and second substrates;
   forming an active region within the seal region;
   forming at least one seal pattern within the seal region between the first and second substrates, the at least one seal pattern having two seal patterns disposed parallel to each other;
   forming a plurality of column spacers within the active region and within the seal region, the plurality of column spacers within the seal region being arranged between the two seal patterns; and
   forming a liquid crystal layer between the first and second substrates.

17. The method according to claim 16, wherein the plurality of column spacers abut the at least one seal pattern.

18. The method according to claim 16, wherein the plurality of column spacers are disposed at a distance from the two seal patterns.

19. The method according to claim 16, wherein the plurality of column spacers within the seal region laterally oppose the at least one seal pattern.

* * * * *